(12) United States Patent
Lin et al.

(10) Patent No.: US 7,170,700 B1
(45) Date of Patent: Jan. 30, 2007

(54) METHOD OF DETERMINING SIDE TRACK ERASURE IN A DISK DRIVE

(75) Inventors: Gang H. Lin, San Jose, CA (US); Erhard Schreck, San Jose, CA (US); Kezhao Zhang, Fremont, CA (US); Don Brunnett, Pleasanton, CA (US); Duc Banh, San Jose, CA (US); Kurt Rusnak, Pleasanton, CA (US); Jingbo Yu, San Jose, CA (US); Suet Teo, San Jose, CA (US); Nick Warner, Livermore, CA (US); John Vicars, Longmont, CO (US)

(73) Assignee: Maxtor Corporation, Longmont, CO (US)

(*) Notice: Subject to any disclaimer, the term of this patent is extended or adjusted under 35 U.S.C. 154(b) by 225 days.

(21) Appl. No.: 10/125,657

(22) Filed: Apr. 18, 2002
(Under 37 CFR 1.47)

Related U.S. Application Data

(60) Provisional application No. 60/285,010, filed on Apr. 19, 2001.

(51) Int. Cl.
 *G11B 27/36* (2006.01)
 *G11B 5/03* (2006.01)
(52) U.S. Cl. .................................. 360/31; 360/66

(58) Field of Classification Search .................... None
See application file for complete search history.

(56) References Cited

U.S. PATENT DOCUMENTS

| | | | | |
|---|---|---|---|---|
| 4,821,125 A | * | 4/1989 | Christensen et al. | 360/31 |
| 6,476,992 B1 | * | 11/2002 | Shimatani | 360/46 |
| 6,791,780 B2 | * | 9/2004 | Lee et al. | 360/66 |

* cited by examiner

*Primary Examiner*—Wayne Young
*Assistant Examiner*—Daniell L. Negrón
(74) *Attorney, Agent, or Firm*—Tejpal S. Hansra

(57) ABSTRACT

A method of determining side track erasure in a disk drive having a disk and a transducer. A target track and one or more side tracks proximate to the target track on the disk are selected, and recording parameters for recording signals on the target track and each side track with the transducer are selected. Thereafter, signals are recorded on each side track and then signals are recorded on the target track multiple times. A reduction in the integrity of the recorded signals on each side track due to recording signals on the target track multiple times is detected, and the detected reduction in the integrity of the recorded signals on each side track represents the amount of the erasure of the recorded signals on the side track. Recording parameters are changed based on the signal integrity reduction to minimize side track erasure.

89 Claims, 9 Drawing Sheets

US 7,170,700 B1

METHOD OF DETERMINING SIDE TRACK ERASURE IN A DISK DRIVE

RELATED APPLICATION

This application claims priority from U.S. Provisional Application Ser. No. 60/285,010, filed on Apr. 19, 2001, entitled "Methods of Monitoring the Erasure of Side Tracks in a Magnetic Storage Device" which is incorporated herein by reference.

FIELD OF THE INVENTION

The present invention relates to disk drives, and more particularly, to unwanted erasure of tracks in disk drives.

BACKGROUND OF THE INVENTION

A disk drive is a data storage device that stores digital data in concentric tracks on a data storage disk. During disk drive operation, the disk is rotated about an axis by a spindle motor while a transducer (head) reads data from and writes data to a target track of the disk. A servo controller uses servo data read from the disk to position the transducer above the target track while the data transfer takes place.

When the transducer moves off-track during a write operation, the transducer might inadvertently write data on or near an adjacent track (squeeze), thus corrupting data on the adjacent track (encroachment). In addition, data that is written off-track by the transducer may be difficult or impossible to read from the target track due to its off-track position. As a result, side track erasure can increase bit error rate (BER) and data loss.

Side track erasure is traditionally addressed by transducer design. However, as transducers operate with higher write magnetization, side track erasure is increasingly difficult to avoid. Furthermore, transducers and disk drives that exhibit errors due to side track erasure are failed and discarded or returned, thereby lowering manufacturing yield and increasing cost.

There is, therefore, a need to detect side track erasure, to minimize side track erasure before user data is harmed, and to reduce failed transducers and disk drives due to side track erasure.

SUMMARY OF THE INVENTION

The present invention satisfies these needs. The present invention provides a method of determining side track erasure in a disk drive that includes recording signals on a signal-detection track, recording signals on a write track multiple times, and detecting a reduction in the integrity of the recorded signals on the signal-detection track due to recording signals on the write track multiple times, thereby determining erasure of the recorded signals on the signal-detection track.

In an embodiment, a method of determining side track erasure in a disk drive includes selecting a target track and one or more side tracks proximate to the target track on a disk, recording signals on each side track with a transducer, recording signals on the target track multiple times with the transducer, and detecting a reduction in the integrity of the recorded signals on each side track due to recording signals on the target track multiple times, wherein the detected reduction in the integrity of the recorded signals on each side track represents the amount of the erasure of the recorded signals on the side track.

In another embodiment, a method of determining side track erasure in a disk drive includes selecting a target track and one or more side tracks proximate to the target track on a disk, recording signals on the target track with a transducer, recording signals on each side track multiple times with the transducer, and detecting a reduction in the integrity of the recorded signals on the target track due to recording signals on each side track multiple times, wherein the detected reduction in the integrity of the recorded signals on the target track represents the amount of the erasure of the recorded signals on the target track.

The reduction in the integrity of the recorded signals on the signal-detection track can be determined by comparing the recorded signals on the signal-detection track before and after recording signals on the write track multiple times, or by reading an error correction code in the recorded signals on the signal-detection track after recording signals on the write track multiple times. Furthermore, when the signal integrity reduction exceeds a limit, a warning along with the track identification can be provided to an end user.

Side track erasure can be determined during self-test in a factory after the disk drive is assembled but before it is shipped to an end user, or during monitoring in the field after it is shipped to an end user.

Side track erasure can be reduced or eliminated by changing recording parameters such as write current, recording frequency and/or track density.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
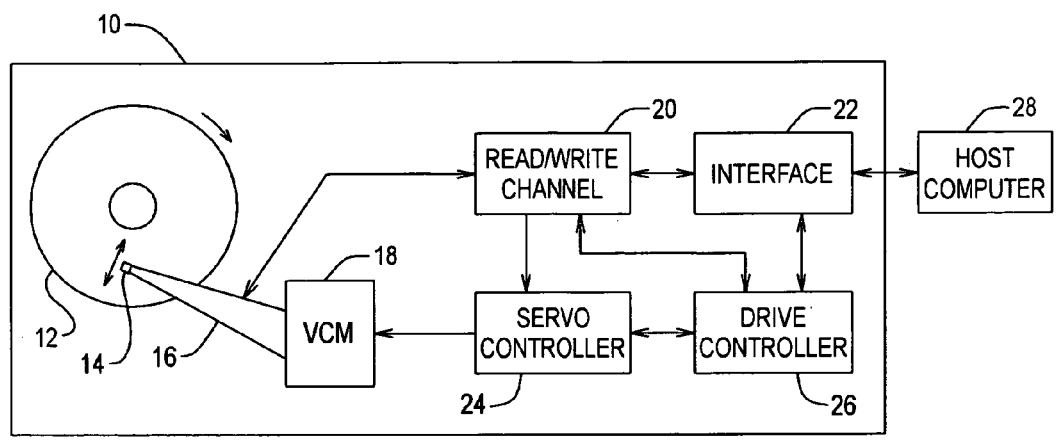
FIG. 1 shows a disk drive in which the present invention can be implemented.

FIG. 1 is a block diagram illustrating disk drive 10 in which the present can be implemented. The disk drive 10 includes a data storage disk 12, a transducer 14, an actuator arm assembly 16, a voice coil motor (VCM) 18, a read/write channel 20, an interface 22, a servo controller 24 and a drive controller 26. The disk drive 10 is coupled to an external host computer 28 that uses the disk drive as a mass storage device.

The disk drive 10 receives read and write requests from the host computer 28 and carries out the requests by performing data transfers between the disk 12 and the host computer 28. In a preferred embodiment, the disk drive 10 includes multiple disks 12 in a vertical stack and multiple transducers 14 with one transducer 14 for each operative disk surface. Typically, both surfaces of each disk 12 store user data and therefore the disk drive 10 includes two transducers 14 for each disk 12. Single-sided disk arrangements can also be used.

The interface 22 provides an interface between the disk drive 10 and the host computer 28. During read and write operations, the interface 22 provides a communications path that includes data buffering between the channel 20 and the host computer 28. In addition, the interface 22 receives commands and requests from the host computer 28 and directs them to the drive controller 26. The drive controller 26 then carries out the commands by appropriately controlling the elements within the disk drive 10.

The VCM 18 positions the transducer 14 with respect to the disk 12 in response to a control signal generated by the servo controller 24. The transducer 14 is coupled to the actuator arm assembly 16 and thus moves under the influence of the VCM 18. When performing a read or write operation, the drive controller 26 instructs the servo controller 24 to move the transducer 14 to a target track on the disk 12 so that a data transfer can take place. The servo controller 24 then generates a control signal to move the transducer 14 to another target track during a seek operation.

Once the transducer 14 has arrived at the target track, the servo controller 24 enters a track follow mode and the transducer 14 is maintained in a substantially centered position above the target track. The bulk of the data transfer between the transducer 14 and the target track occurs during the track follow mode.

The channel 20 performs data transformations to provide communication between the disk 12 and the host computer 28. For example, during a write operation, the channel 20 converts digital data received from the host computer 28 into an analog write current for delivery to the transducer 14. During a read operation, the channel 20 converts an analog read signal received from the transducer 14 into a digital representation that can be recognized by the host computer 28. The channel 20 also separates out servo information read by the transducer 14 and directs the servo information to the servo controller 24 for positioning the transducer 14.

The blocks illustrated in FIG. 1 are functional in nature and do not necessarily represent discrete hardware elements. For example, two or more of the functional blocks within disk drive 10 can be implemented in software in a common digital processor.

Figure 2A:
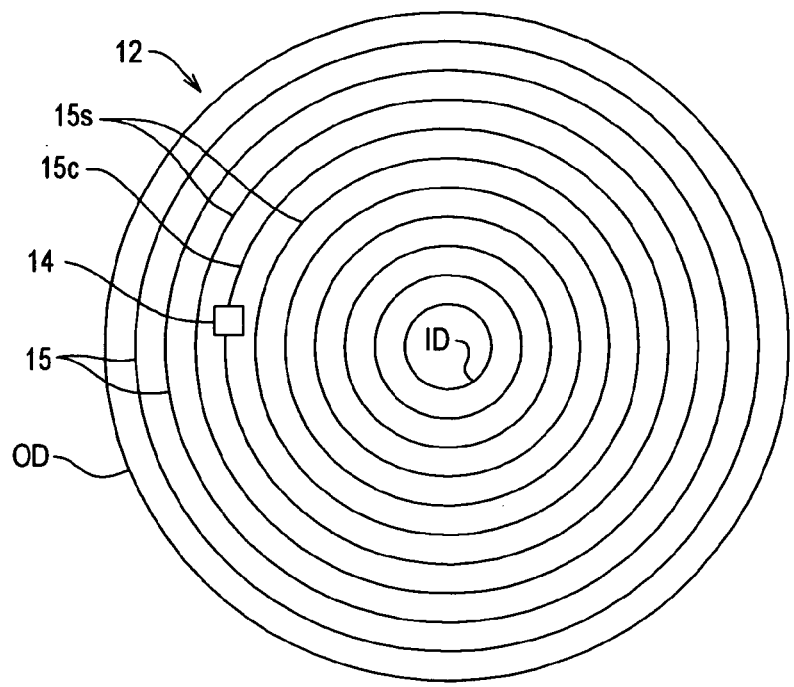
FIG. 2A shows a disk with concentric tracks.

FIG. 2A shows disk 12 with tracks 15. The transducer 14 is positioned over a track 15. The tracks 15 are concentrically arranged between an inner diameter (ID) and an outer diameter (OD) of the disk 12. Furthermore, the tracks 15 include a center track 15c and two side tracks 15s. The center track 15c is between and adjacent to the side tracks 15s.

Figure 2B:
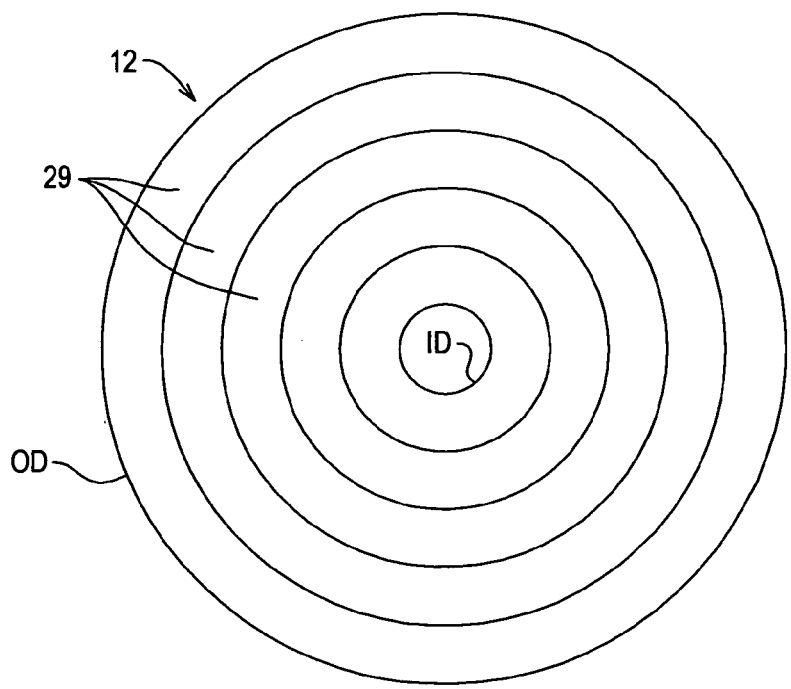
FIG. 2B shows a disk with zones that each include concentric tracks.

FIG. 2B shows disk 12 with zones 29. Each zone 29 includes multiple tracks 15.

A method of determining side track erasure in the disk drive 10 includes selecting a target track and one or more side tracks proximate to the target track on the disk 12, recording signals on each side track with the transducer 14, recording signals on the target track multiple times with the transducer 14, and detecting a reduction in the integrity of the recorded signals on each side track due to recording signals on the target track multiple times with the transducer 14. The detected reduction in the integrity of the recorded signals on each side track represents the amount of the erasure of the recorded signals on the side track.

For example, after the disk drive 10 is assembled, during a self-test at the factory before the disk drive 10 is shipped to an end user, a specific area of the disk 12 is designated for write tests with the transducer 14. The specific area of the disk 12 includes a minimum of one sector and at least three tracks such as a target track 15c and two or more neighboring signal-detection side tracks 15s. The target track 15c is reserved for multiple writings/recordings, and the signal integrity (signal characteristics) of a written pattern previously recorded on the side tracks 15s is measured before and after the multiple writes to the target track 15c. A change in the signal integrity can include changes in one or more of amplitude, error rate, BER (bit error rate), MSE (mean square error) and other suitable parameters. Thus, a reduction in the signal integrity can include a reduction in amplitude and/or an increase in error rate.

Recording parameters are selected for the target track 15c and the side tracks 15s. The recording parameters can include the write pattern, write current, track density and/or recording frequency for one or more of the three tracks 15c and 15s. The write current refers to the saturation value and the boost value. The track density refers to the track separation or track pitch and is typically measured in tracks per inch (TPI). The recording frequency refers to the data rate and is typically measured in bits per inch (BPI).

A specified limit is selected for the signal integrity reduction in each side track 15s determined by comparing the signal integrity in each side track 15s before and after the multiple writes to the target track 15c. If the side track 15s signal integrity reduction exceeds the limit, a warning of side track erasure along with the side track identification is provided, for instance to an end user. In addition, to eliminate the side track erasure, the write current is reduced.

Figure 3:
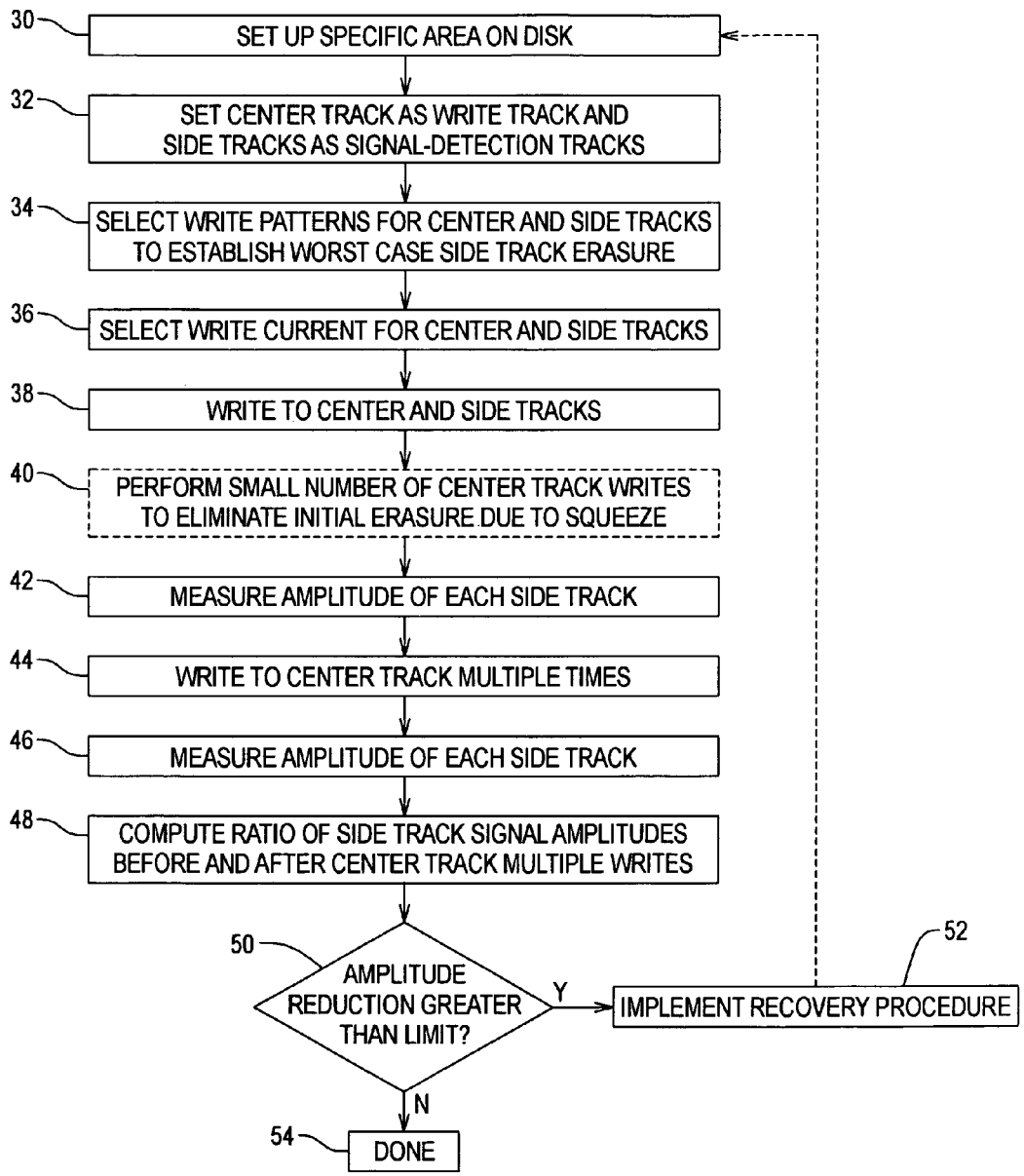
FIG. 3 shows a flowchart of an embodiment of detecting side track erasure.

FIG. 3 is a flowchart of an embodiment of detecting side track erasure and includes the steps of:

1. Set up a specific area on the disk 12, minimum one sector long and at least three tracks wide, that includes the center track 15c and the side tracks 15s (step 30);

2. Select the center track 15c as the write track and the side tracks 15s as the signal-detection tracks (step 32);

3. Select the write patterns for the center track 15c and the side tracks 15s (the write pattern for each track can be different) to establish the worst case erasure for the side tracks 15s. For example, the write patterns can be low frequency for the center track 15c and high frequency for the side tracks 15s (step 34);

4. Select a write current for the center track 15c and the side tracks 15s. The write current should be higher than the typical servo and data write current for all zones 29 to provide further worst case margin (step 36);

5. Write to the center track 15c and the side tracks 15s with the transducer 14 (step 38);

6. Optionally, perform a small number of writes to the center track 15c to eliminate initial erasure due to squeeze effects caused by non-repeatable runout (random noise) and to average out such effects (step 40);

7. Measure the amplitude of the side tracks 15s (step 42);

8. Perform multiple writes to the center track 15c. The number of writes can range from 1 to 500,000 (step 44);

9. Measure the amplitude of the side tracks 15s again (step 46);

10. Compute the ratio of the amplitudes measured in steps 42 and 46 for each side track 15s (step 48);

11. Determine if the amplitude reduction is greater than a specified limit, such as 5% to 10%, to detect amplitude reduction indicative of signal integrity degradation (step 50), if so the disk drive 10 fails and a recovery procedure is implemented (step 52) otherwise the disk drive 10 passes (step 54). After the recovery procedure in step 52, the side track erasure detection can be performed again.

The side track erasure detection can be performed in the factory at self-test or in the field as constant monitoring. The recovery procedure at self-test can reduce the write current and then re-optimize, and the recovery procedure in the field can reduce the write current and provide a user warning or data backup.

The side track erasure is worst at elevated temperatures and elevated write currents. The temperature sensitivity is believed to be due to the temperature sensitivity of the coercivity of the recording media in the disk 12. Because self-test may be performed below the maximum temperature for the disk drive 10, the write current is increased above the normal operating range when writing to the center track 15c multiple times. The increased stress ensures that the disk drive 10 will not generate side track erasure when operated at its maximum temperature. For example, the write current can be increased by 5 mA for self-test. After writing to the center track 15c multiple times, the side tracks 15s are read to determine if they have been damaged.

As an alternative to damage determined by amplitude reduction, damage is determined by ECC errors (errors after error correction code) with a reduced number of retries. Because side track erasure may fall off with distance in the off-track (radial) direction, squeeze (such as transducer off-track by 1% to 20% of track pitch) can be introduced in the adjacent tracks to simulate track misregistration.

Figure 4:
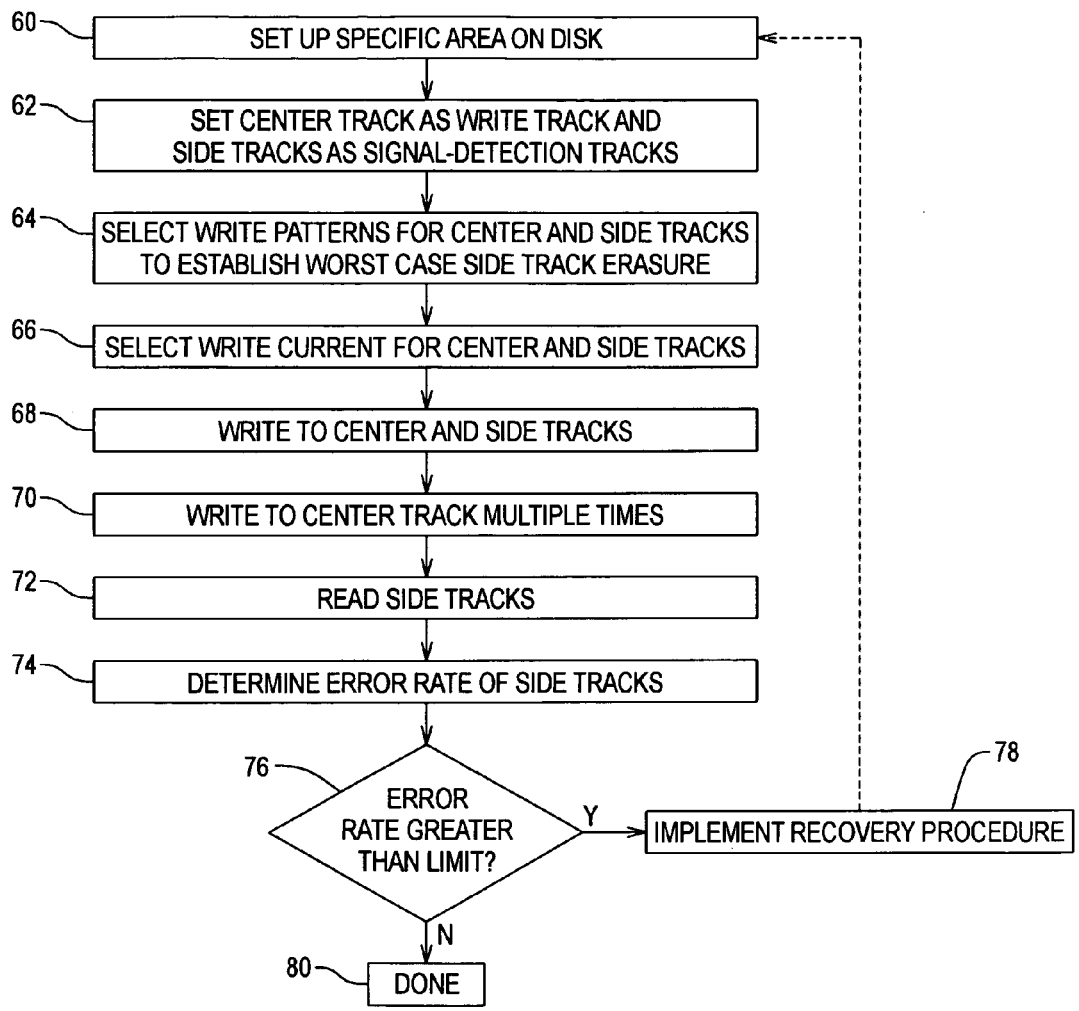
FIG. 4 shows a flowchart of another embodiment of detecting side track erasure.

FIG. 4 is a flowchart of another embodiment of detecting side track erasure and includes the steps of:

1. Set up a specific area on the disk 12, minimum one sector long and at least three tracks wide, that includes the center track 15c and the side tracks 15s (step 60);

2. Select the center track 15c as the write track and the side tracks 15s as the signal-detection tracks (step 62);

3. Select the write patterns for the center track 15c and the side tracks 15s (the write pattern for each track can be different) to establish the worst case erasure for the side tracks 15s. For example, the write patterns can be low frequency for the center track 15c and high frequency for the side tracks 15s (step 64);

4. Select a write current for the center track 15c and the side tracks 15s. The write current should be higher than the typical servo and data write current for all zones 29 to provide further worst case margin (step 66);

5. Write to the center track 15c and the side tracks 15s with the transducer 14 (step 68);

6. Perform multiple writes to the center track 15c. The number of writes can range from 1 to 500,000 (step 70);

7. Read the side tracks 15s (step 72);

8. Determine the error rate of the side tracks 15s (step 74);

9. Determine if the error rate is higher than a specified limit, such as a user set bit error rate by more than 0.1 order of magnitude, for example from about $1 \times 10^{-5}$ to $1 \times 10^{-6}$ (step 76), if so the disk drive 10 fails and a recovery procedure is implemented (step 78) otherwise the disk drive 10 passes (step 80). After the recovery procedure in step 78, the side track erasure detection can be performed again.

An example side track erasure test is now described for two transducers with different geometries. The center track and the side tracks were written to using a write current of 50 mA, then the center track was written to multiple times using a write current of 50 mA. For one transducer the side track amplitude loss was on the order of 13%, and for the other transducer the side track amplitude loss was on the order of 22%. For both transducers, the side track amplitude loss for the second next side tracks was essentially 0% to 1.5%. As a result, a write current of 50 mA was unacceptable for the transducers, and the write current was reduced. Details of the erasure test process follow.

The side track erasure tests measure the effects of repeatedly writing to a track such that the writing extends to its neighboring tracks. A series of side tracks are written to at high frequency, and then a target track proximate to the side tracks is repeatedly written to at a different high frequency. The amplitudes of the side track signals are measured before and after the multiple writes to the target track. The ratio of the measured side track amplitudes before and after the multiple writes to the target track represents the amount of side track erasure. The process can be implemented as a test module during self-test in a factory. In the test module, various parameters including the number of side tracks, track separation, recording frequency, write current and number of writes can be adjusted.

In one example, six side tracks are written to between a center track and the ID of the disk, and another six side tracks are written to between the center track and the OD of the disk (12 side tracks total). All tests are carried out at the zone whose track number is 6000. Two transducers with different geometries are tested. Each side track erasure test measurement is repeated twice, and the two measurements are averaged. First considered is the erasure of the two side tracks immediately adjacent the center track on the ID and OD sides of the center track. The ID ratio is the ratio of the amplitude of the first peak on the ID side of the center track before and after the multiple writes to the center track. The OD ratio occurs on the OD side of the center track. The smaller the ratio, the greater the side track erasure.

FIGS. 5A–5G show plots of the effects of recording parameters on the erasure of the side tracks due to multiple recordings on the center track. The plots monitor the signal amplitude reduction as a representation of side track erasure although other signal characteristics can be monitored. In addition, the plots show the signal amplitude reduction as the ID ratio and the OD ratio as a function of the recording parameters.

Figure 5A:
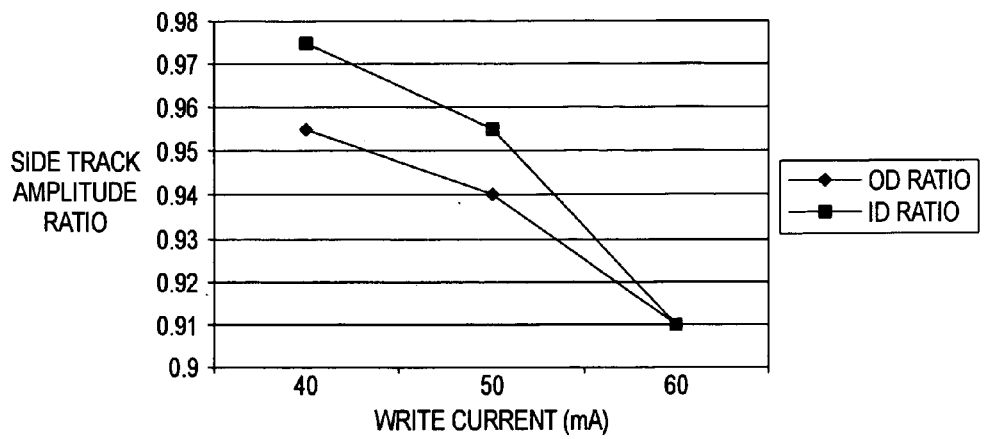
FIG. 5A shows a plot of the effect of write current on side track erasure.

FIG. 5A shows a plot of the effect of write current on side track erasure for the following test conditions: track pitch=21 micro inches, number of center track writes=1000, center track recording frequency=150 Mflux/s and side track recording frequency=100 Mflux/s. As illustrated, side track erasure increases with write current.

Figure 5B:
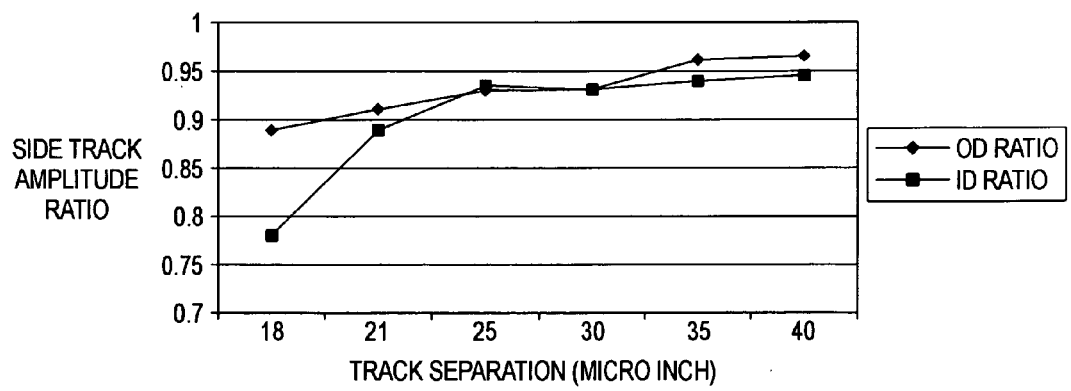
FIG. 5B shows a plot of the effect of track separation on side track erasure.

FIG. 5B shows a plot of the effect of track separation on side track erasure for the following test conditions: write current=60 mA, number of center track writes=1000, center track recording frequency=150 Mflux/s and side track recording frequency=100 Mflux/s. As illustrated, side track erasure increases as track separation decreases (track density increases).

Figure 5C:
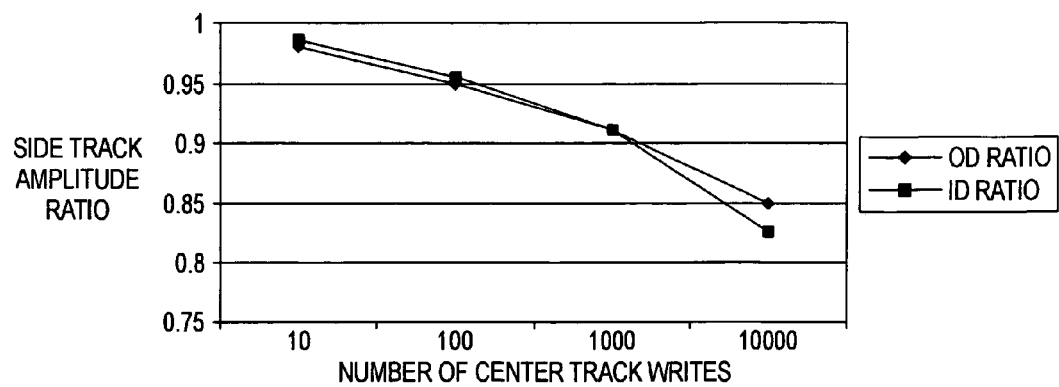
FIG. 5C shows a plot of the effect of the number of center track writes on side track erasure.

FIG. 5C shows a plot of the effect of the number of center track writes on side track erasure for the following test conditions: track pitch=21 micro inches, write current=60 mA, center track recording frequency=150 Mflux/s and side track recording frequency=100 Mflux/s. As illustrated, side track erasure increases with the number of writes to the center track. The side track erasure curves increase gradually with the number of center track writes because the curves are linear in the log-linear plot. In this example, the side track erasure (E) increases logarithmically with the number of center track writes (n), that is, E=constant×log(n). Furthermore, the side track erasure versus side track erasure time can have different characteristics than the example given.

Figure 5D:
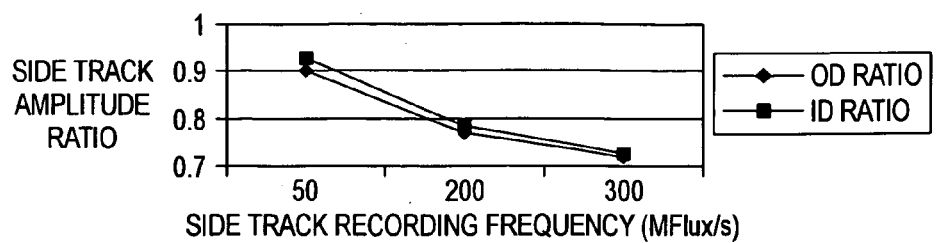
FIGS. 5D–5F show plots of the effect of center and side track recording frequencies on side track erasure.
Figure 5E:
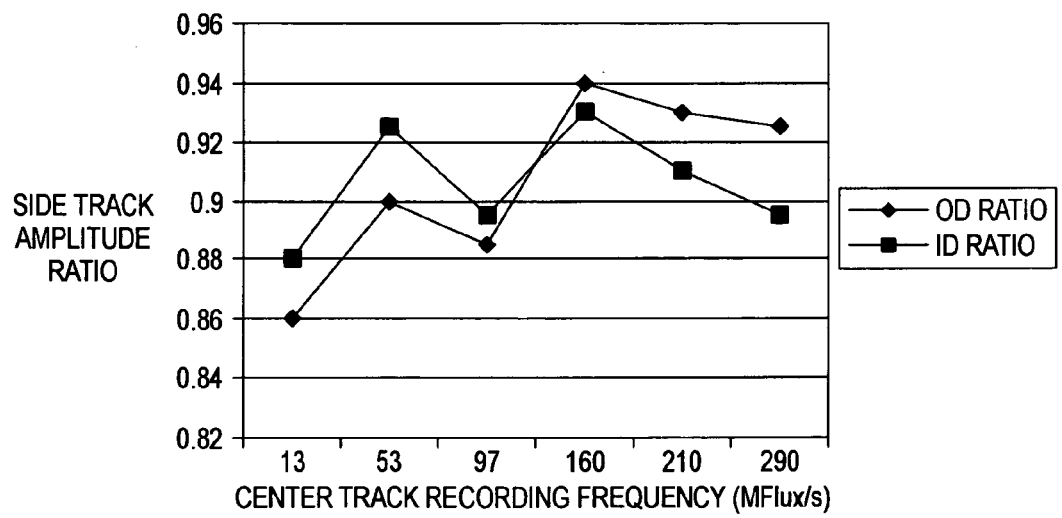
Figure 5F:
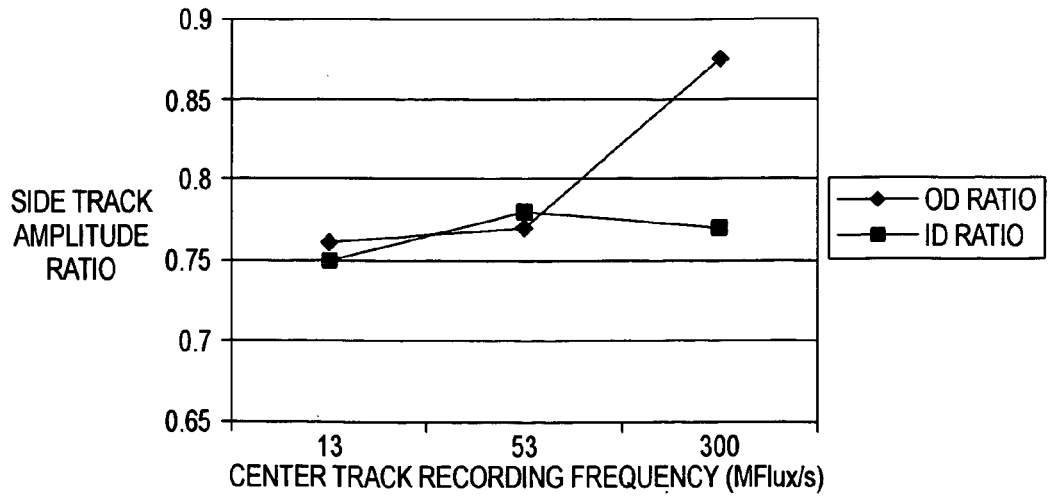

FIGS. 5D–5F show plots of the effect of center and side track recording frequencies on side track erasure for the following test conditions: write current=60 mA, track pitch=21 micro inches and number of center track writes=1000. FIG. 5D shows a plot of the effect of side track recording frequency on side track erasure for a center track recording frequency of 53 Mflux/s, FIG. 5E shows a plot of the effect of center track recording frequency on side track erasure for a side track recording frequency of 50 Mflux/s, and FIG. 5F shows a plot of the effect of center track recording frequency on side track erasure for a side track recording frequency of 200 Mflux/s. As illustrated, side track erasure is mainly influenced by side track recording frequency, and the higher the side track recording frequency, the higher the side track erasure due to multiple writes to the center track.

Figure 5G:
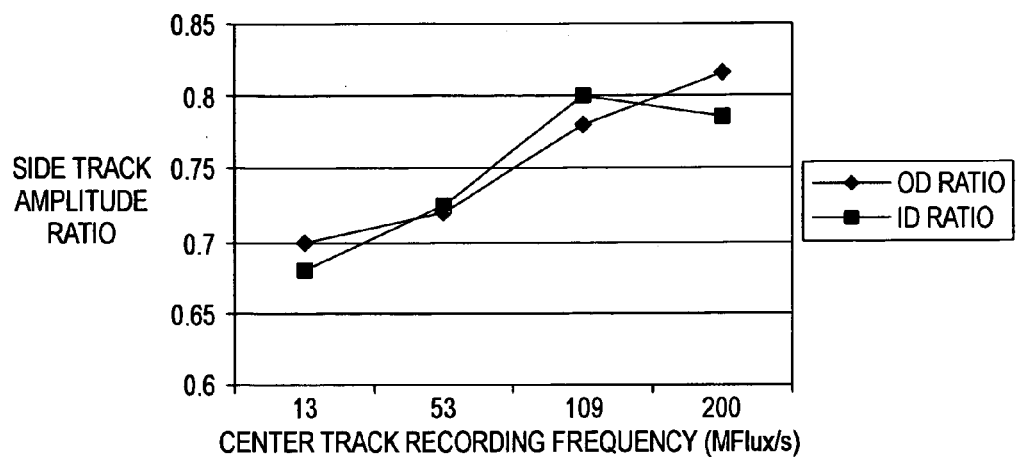
FIG. 5G shows a plot of the effect of center track recording frequency on side track erasure for a side track recording frequency.

FIG. 5G shows a plot of the effect of center track recording frequency on side track erasure for a side track recording frequency of 300 Mflux/s. As illustrated, side track erasure is mild and decreases as center track recording frequency increases. This indicates that side track erasure is not caused by protrusion (transducer off-track) and is more likely the result of the demagnetization field in the side tracks.

To increase disk drive production yield, the disk drives and/or transducers that cause unacceptable side track erasure are recovered by re-optimization of the recording parameters rather than discarded. For example, during write current optimization, the adjacent side tracks 15s are written with the test write current while the side tracks 15s are squeezed in by a specified amount. To optimize to a lower write current, the adjacent side tracks 15s are written to multiple times with an increased write current. For example, the adjacent side tracks 15s are written to eight times with an additional 8 mA of write current.

Side track erasure is also sensitive to track density and recording frequency. The lower the track density and the lower the recording frequency, the lower the side track erasure.

Figure 6:
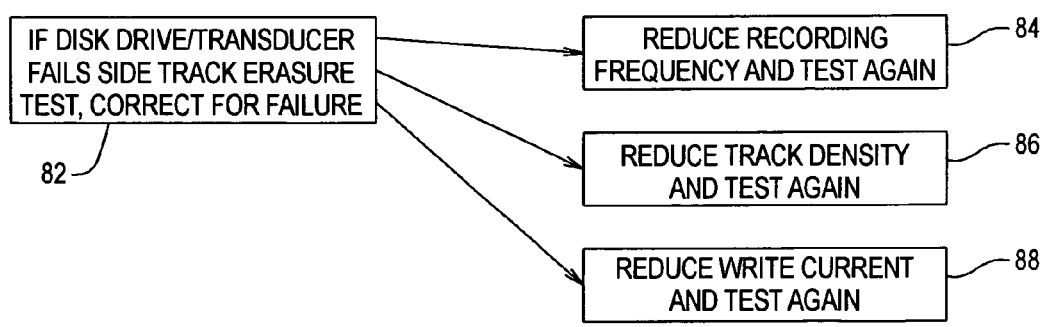
FIG. 6 shows a flowchart of recovery procedures for side track erasure.

FIG. 6 shows a flowchart of recovery procedures for side track erasure. If a disk drive or a transducer fails a side track erasure test (step 82), corrective steps such as adjusting/optimizing the recording parameters can include the following recovery procedures: reducing the recording frequency and testing again (step 84), reducing the track density and testing again (step 86), and/or reducing the write current and testing again (step 88) until the disk drive passes the side track erasure test. Other recording parameters can be modified as appropriate to pass the disk drive.

For example, if a disk drive passes optimization testing at the high recording frequency and/or track density, then a side track erasure test is performed by writing to a target track once and then writing to side tracks proximate to the target track multiple times at an elevated write current. The BER of the target track is measured and compared to a specified limit. Because side track erasure can be worse on one side of the transducer, it is preferable to write to side tracks on both sides of the target track if time allows. If the disk drive fails the BER test, the disk drive is tested at the next lower recording frequency. The above example provides (a) measuring side track erasure through BER measured directly or after ECC/retry, (b) adding stress with off-track squeeze of the side tracks, (c) adding stress with increased write current, (d) adding stress with increased recording frequency, (e) using multiple writes in the optimization, and (f) changing recording parameters such as the recording frequency, track density (per zone, per transducer) and write current as a function of side track erasure to pass a disk drive that would otherwise fail.

Side track erasure can occur several tracks away from a center track, with the adjacent side tracks essentially unaffected. The present invention is also applicable to non-adjacent side track erasure. For example, instead of writing to only one side track on each side of a center track, two or more (N) side tracks on each side of a center track (proximate to but not necessarily adjacent to the center track) are written to with a write pattern and their amplitudes are measured. Then, after writing multiple times to the center track, the amplitudes of the side tracks are measured again. The measured amplitudes of the side tracks, before and after writing to the center track multiple times, are compared to determine erasure of the 2N side tracks (N side tracks on each side of the center track). The value N can be selected based on the transducer geometry, such as the number of tracks that encompass the width of the transducer. For example, N=3. If the BER indicates side track erasure, the BER of N side tracks is monitored.

Figure 7:
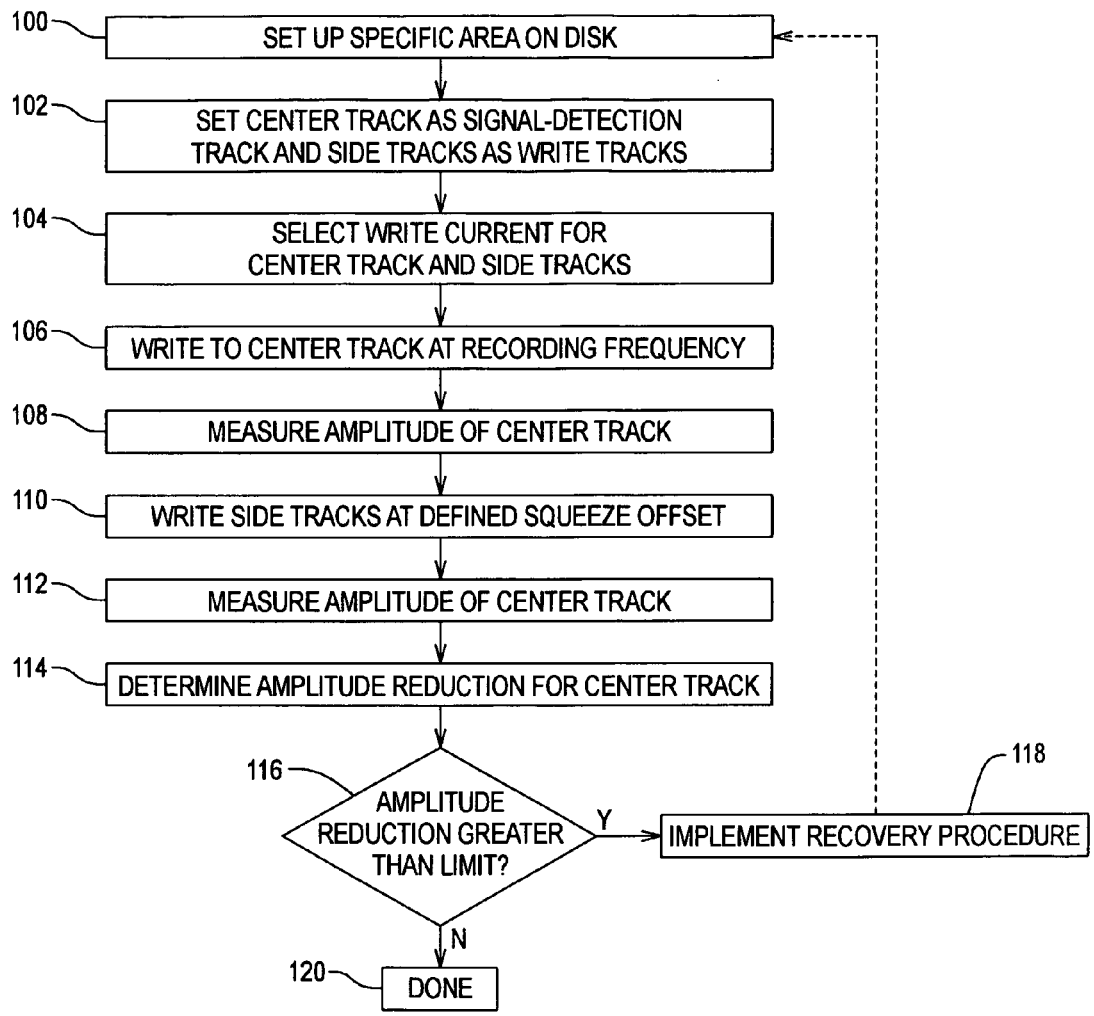
FIG. 7 shows a flowchart of another embodiment of detecting side track erasure.

FIG. 7 shows a flowchart of another embodiment of detecting side track erasure. As an alternative to writing to the center track multiple times and detecting erasure of the side tracks, the method includes writing to the side tracks multiple times and detecting erasure of the center track.

The method begins by setting up a specific disk area that includes the center track 15c and side tracks 15s for the side track erasure test (step 100). The center track 15c is selected as the signal-detection track and the side tracks 15s are selected as the write tracks (step 102). The erasure testing includes selecting a write current for the transducer 14 (step 104), writing to the center track 15c at high frequency (1T) flux transitions (step 106) and measuring the peak amplitude of the center track 15c (step 108). The peak amplitude is measured across the entire center track 15c with a spectral filter tuned to the frequency of the written transitions. Then a seek is performed to the selected side tracks 15s at a defined squeezed position towards the ID and the OD of the disk 12 and signals at a selected frequency are recorded on each side track 15s (step 110).

Recording parameters that can be adjusted include the side track squeeze, write current, recording frequency, and number of adjacent track writes. Once the desired combination of variables is established, recording signals on each side track is performed. After completing writing to one selected side track 15s, the same writing process may be repeated using another side track 15s in the specific disk area. Then the peak amplitude of the center track 15c is re-measured in the same manner as it was originally measured (step 112). The re-measured peak amplitude of the center track 15c is compared to the originally measured peak amplitude of the center track 15c to determine the amplitude reduction and thus the signal integrity degradation of the center track 15c due to the multiple writes to the side tracks 15s (step 114). Because the recording parameters can be adjusted for test purposes, this process can be a highly accelerated. It is determined whether the amplitude reduction of the center track 15c is greater than a specified limit (step 116), if so a recovery procedure is performed (step 118) otherwise the disk drive 10 passes (step 120). After the recovery procedure in step 118, the side track erasure detection can be performed again.

Figure 8:
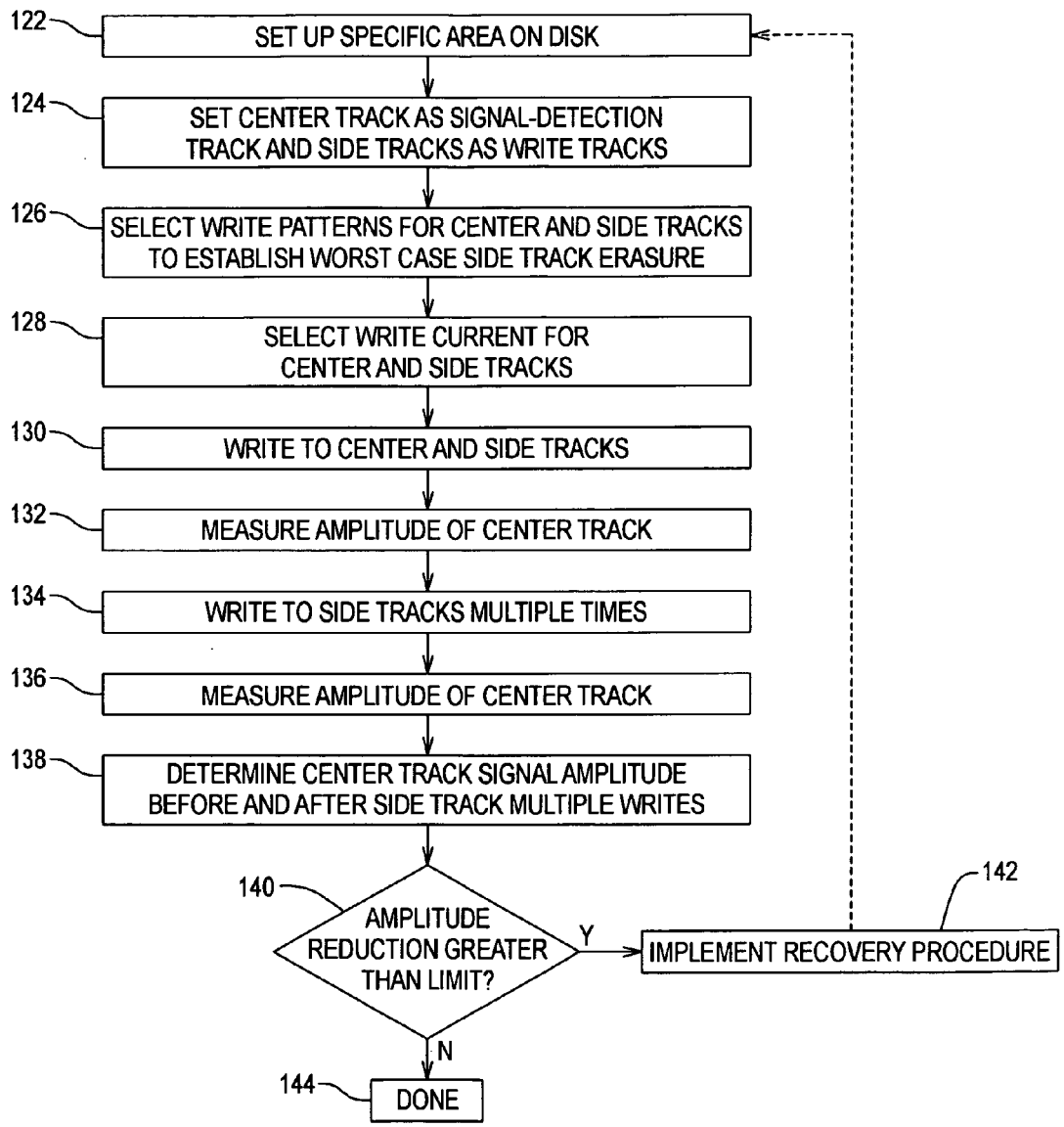
FIG. 8 shows a flowchart of another embodiment of detecting side track erasure.

FIG. 8 is a flowchart of another embodiment of detecting side track erasure and includes the steps of:

1. Set up a specific area on the disk 12, minimum one sector long and at least three tracks wide, that includes the center track 15c and the side tracks 15s (step 122);

2. Set the center track 15c as the signal-detection track and the side tracks 15s as the write tracks (step 124);

3. Select the write patterns for center track 15c and the side tracks 15s (the pattern for each track can be different) to establish the worst case erasure for the center track 15c. For example, the write patterns can be low frequency for the center track 15c and high frequency for the side tracks 15s (step 126);

4. Select a write current for the center track 15c and the side tracks 15s. The write current can be higher than the typical servo and data write current for all zones 29 to provide further worst case margin (step 128);

5. Write to the center track 15c and the side tracks 15s with the transducer 14 (step 130);

6. Measure the amplitude of the center track 15c (step 132);

7. Perform multiple writes to the side tracks 15s. The number of writes can range from 1 to 500,000 per side track 15s (step 134) and this step can be repeated on the other side tracks 15s until the desired number of side tracks 15s have been written to;

8. Measure the amplitude of the center track 15c again (step 136);

9. Compute the ratio of the amplitudes measured in steps 132 and 136 (step 138);

10. Determine if the amplitude reduction is greater than a specified limit (step 140), if so the disk drive 10 fails and a recovery procedure is implemented (step 142) otherwise the disk drive 10 passes (step 144). After the recovery procedure in step 142, the side track erasure detection can be performed again.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of determining side track erasure in a disk drive having a disk and a transducer, comprising the steps of:
   (a) selecting a target track and one or more side tracks proximate to the target track on the disk;
   (b) recording signals on each side track with the transducer;
   (c) recording signals on the target track multiple times with the transducer; and
   (d) detecting a reduction in the integrity of the recorded signals on each side track due to recording signals on the target track multiple times, wherein the detected reduction in the integrity of the recorded signals on each side track represents the amount of the erasure of the recorded signals on the side track.

2. The method of claim 1, wherein:
   step (b) further includes the step of measuring the amplitude of the recorded signals on each side track; and
   in step (d) detecting the reduction in the integrity of the recorded signals on each side track comprises the steps of:
   remeasuring the amplitude of the recorded signals on the side track, and
   comparing the amplitude of the recorded signals on the side track measured before recording signals on the target track multiple times with the amplitude of the recorded signals on the side track remeasured after recording signals on the target track multiple times to determine the amount of reduction in the amplitude of the signals recorded on the side track due to recording signals on the target track multiple times.

3. The method of claim 1, wherein:
   step (a) further includes the step of selecting recording parameters for recording signals on the target track and each side track; and
   step (d) further includes the step of adjusting one or more of the recording parameters to reduce the side track erasure.

4. The method of claim 1, wherein:
   step (b) further comprises the step of selecting a write current for the transducer for recording signals on each side track; and
   step (c) further comprises the step of selecting a write current for the transducer for recording signals on the target track multiple times.

5. The method of claim 4, wherein step (d) further comprises the steps of:
   determining the dependence of the side track erasure on the target track write current; and
   adjusting the target track write current to reduce the side track erasure.

6. The method of claim 4, wherein step (d) further comprises the steps of:
   determining the dependence of the side track erasure on the side track write current; and
   adjusting the side track write current to reduce the side track erasure.

7. The method of claim 1, wherein:
   step (b) further comprises the step of selecting a recording frequency for each side track, and recording signals on each side track at the selected side track frequency; and
   step (c) further comprises the step of selecting a recording frequency for the target track, and recording signals on the target track at the selected target track frequency.

8. The method of claim 7, further comprising the steps of:
   determining the dependence of the side track erasure on the target track recording frequency; and
   adjusting the target track recording frequency to reduce the side track erasure.

9. The method of claim 7, further comprising the steps of:
   determining the dependence of the side track erasure on the side track recording frequency; and
   adjusting the side track recording frequency to reduce the side track erasure.

10. The method of claim 1, wherein:
    step (a) further comprises the step of selecting a track density for recording signals on the target track and each side track;
    step (b) further includes the step of recording signals on each side track at the track density; and
    step (c) further includes the step of recording signals on the target track at the track density.

11. The method of claim 10, further comprising the steps of:
    determining the dependence of the side track erasure on the track density; and
    adjusting the track density to reduce the side track erasure.

12. The method of claim 1, wherein data is recorded on the disk in concentric tracks within multiple zones, and steps (a) through (d) are performed for each zone.

13. The method of claim 1, wherein:
step (b) further includes the step of determining characteristics of the recorded signals on each side track; and
in step (d) detecting the reduction in the integrity of the recorded signals on each side track comprises the steps of:
determining characteristics of the recorded signals on the side track after recording signals on the target track multiple times, and
comparing the characteristics of the side track recorded signals determined before recording signals on the target track multiple times with the characteristics of the side track recorded signals determined after recording signals on the target track multiple times to determine the amount of reduction in the integrity of the signals recorded on the side track due to recording signals on the target track multiple times.

14. A method of determining side track erasure in a disk drive having multiple disks and corresponding transducers, comprising the steps of:
for each disk and corresponding transducer, performing the steps of:
(a) (1) selecting a target track and one or more side tracks proximate to the target track on the disk, and (2) selecting recording parameters for recording signals on the target track and each side track with the transducer;
(b) recording signals on each side track with the transducer;
(c) recording signals on the target track multiple times with the transducer; and
(d) detecting a reduction in the integrity of the recorded signals on each side track due to recording signals on the target track multiple times, wherein the detected reduction in the integrity of the recorded signals on each side track represents the amount of the erasure of the recorded signals on the side track.

15. The method of claim 14, wherein:
step (b) further includes the step of measuring the amplitude of the recorded signals on each side track; and
in step (d) detecting the reduction in the integrity of the recorded signals on each side track comprises the steps of:
remeasuring the amplitude of the recorded signals on the side track, and
comparing the amplitude of the side track measured before recording signals on the target track multiple times with the amplitude of the side track remeasured after recording signals on the target track multiple times to determine amount of reduction in the amplitude of the signals recorded on the side track due to recording signals on the target track multiple times.

16. The method of claim 14, wherein:
step (d) further includes the steps of adjusting one or more of the recording parameters to reduce the side track erasure.

17. The method of claim 16, wherein the step of adjusting the recording parameters includes the steps of selecting a write current and a recording frequency for the target track, and selecting a write current and a recording frequency for each side track.

18. The method of claim 17, wherein step (d) further comprises the steps of:
determining the dependence of the side track erasure on the target track write current, and adjusting the target track write current to reduce the side track erasure.

19. The method of claim 17, wherein step (d) further comprises the steps of:
determining the dependence of the side track erasure on the side track recording frequency, and adjusting the side track recording frequency to reduce the side track erasure.

20. The method of claim 17, wherein step (d) further comprises the steps of:
determining the dependence of the side track erasure on the target track recording frequency, and adjusting the target track recording frequency to reduce the side track erasure.

21. The method of claim 17, wherein:
step (a) further comprises the step of selecting a track density for recording signals on the target track and each side track; and
step (d) further comprises the steps of determining the dependence of the side track erasure on the track density, and adjusting the track density to reduce the side track erasure.

22. The method of claim 14, wherein each side track is adjacent to the target track.

23. The method of claim 14, wherein each side track is not adjacent to the target track.

24. The method of claim 14, wherein steps (b) through (d) are performed in the field after shipping the disk drive to an end user.

25. A method of determining side track erasure in a disk drive having a disk and a transducer, comprising the steps of:
selecting a write track and a signal-detection track on the disk;
recording signals on the signal-detection track with the transducer;
recording signals on the write track multiple times with the transducer; and
detecting a reduction in the integrity of the recorded signals on the signal-detection track due to recording signals on the write track multiple times, wherein the detected reduction in the integrity of the recorded signals on the signal-detection track represents the amount of the erasure of the recorded signals on the signal-detection track, thereby representing the side track erasure.

26. The method of claim 25, wherein the write track and the signal-detection track are proximate to one another.

27. The method of claim 26, wherein the write track and the signal-detection track are adjacent to one another.

28. The method of claim 26, wherein the write track and the signal-detection track are not adjacent to one another.

29. The method of claim 25, wherein:
recording signals on the signal-detection track includes writing a first write pattern on the signal-detection track; and
recording signals on the write track includes writing a second write pattern on the write track, and the first and second write patterns are different.

30. The method of claim 25, wherein:
recording signals on the signal-detection track includes writing a write pattern at a first frequency on the signal-detection track; and recording signals on the write track includes writing a write pattern at a second frequency on the write track, and the first and second frequencies are different.

31. The method of claim 25, wherein recording signals on the signal-detection track and the write track includes squeezing the signal-detection track and the write track towards one another by a specified limit.

32. The method of claim 25, wherein recording signals on the write track includes using a write current that is larger than a normal operating range of the write current for the transducer.

33. The method of claim 25, wherein recording signals on the write track includes using a write current that is larger than a write current for writing servo patterns to the disk with the transducer.

34. The method of claim 25, wherein recording signals on the write track includes using a write current that is larger than a write current for writing data to the disk with the transducer.

35. The method of claim 25, wherein detecting the reduction in the integrity of the recorded signals on the signal-detection track includes:
determining a characteristic of the recorded signals on the signal-detection track before recording signals on the write track multiple times;
determining a characteristic of the recorded signals on the signal-detection track after recording signals on the write track multiple times; and
comparing the characteristics of the recorded signals on the signal-detection track.

36. The method of claim 35, wherein the characteristics include amplitude.

37. The method of claim 35, wherein the characteristics include error rate.

38. The method of claim 35, wherein the characteristics include bit error rate.

39. The method of claim 35, wherein the characteristics include mean square error.

40. The method of claim 25, further including adjusting a recording parameter to reduce the side track erasure in response to the reduction in the integrity of the recorded signals on the signal-detection track exceeding a specified limit.

41. The method of claim 40, wherein the recording parameter is a write current for recording signals on the disk.

42. The method of claim 41, wherein the recording parameter is a write current for recording signals on the write track.

43. The method of claim 41, wherein the recording parameter is a write current for recording signals on the signal-detection track.

44. The method of claim 40, wherein the recording parameter is a recording frequency for recording signals on the disk.

45. The method of claim 44, wherein the recording parameter is a recording frequency for recording signals on the write track.

46. The method of claim 44, wherein the recording parameter is a recording frequency for recording signals on the signal-detection track.

47. The method of claim 40, wherein the recording parameter is a track density for recording tracks on the disk.

48. The method of claim 47, wherein the recording parameter is a track density for the write track.

49. The method of claim 47, wherein the recording parameter is a track density for the signal-detection track.

50. The method of claim 25, further including:
selecting a second signal-detection track on the disk, wherein the signal-detection track is radially positioned between the write track and the second signal-detection track;
recording signals on the second signal-detection track with the transducer; and
detecting a reduction in the integrity of the recorded signals on the second signal-detection track due to recording signals on the write track multiple times, wherein the detected reduction in the integrity of the recorded signals on the second signal-detection track represents the amount of the erasure of the recorded signals on the second signal-detection track.

51. The method of claim 25, further including:
selecting a second signal-detection track on the disk, wherein the write track is radially positioned between the signal-detection track and the second signal-detection track;
recording signals on the second signal-detection track with the transducer; and
detecting a reduction in the integrity of the recorded signals on the second signal-detection track due to recording signals on the write track multiple times, wherein the detected reduction in the integrity of the recorded signals on the second signal-detection track represents the amount of the erasure of the recorded signals on the second signal-detection track.

52. The method of claim 25, further including performing a recovery procedure in response to the reduction in the integrity of the recorded signals on the signal-detection track exceeding a specified limit, and then repeating (1) recording signals on the signal-detection track, (2) recording signals on the write track multiple times, and then (3) detecting a reduction in the integrity of the recorded signals on the signal-detection track.

53. The method of claim 52, wherein the recovery procedure includes adjusting a recording parameter to reduce the side track erasure.

54. The method of claim 53, wherein the recording parameter is a write current for recording signals on the disk.

55. The method of claim 53, wherein the recording parameter is a recording frequency for recording signals on the disk.

56. The method of claim 53, wherein the recording parameter is a track density for recording tracks on the disk.

57. The method of claim 53, wherein the recording parameter is the number of times of recording signals on the write track.

58. The method of claim 53, wherein the recording parameter is the number of signal-detection tracks on the disk.

59. The method of claim 25, further including providing a warning with a track identification in response to the reduction in the integrity of the recorded signals on the signal-detection track exceeding a specified limit.

60. The method of claim 25, further including providing a data backup in response to the reduction in the integrity of the recorded signals on the signal-detection track exceeding a specified limit.

61. The method of claim 25, wherein the disk includes multiple zones, and the method is performed on a zone-by-zone basis.

62. The method of claim 25, wherein the disk drive includes multiple transducers, and the method is performed on a transducer-by-transducer basis.

63. The method of claim 25, including performing the method in a factory before the disk drive is shipped to an end user.

64. The method of claim 25, including performing the method in the field after the disk drive is shipped to an end user.

65. A method of determining and reducing side track erasure in a disk drive having a disk and a transducer, comprising the steps of:
selecting a write track and a signal-detection track on the disk, wherein the write track and the signal-detection track are proximate to one another;
recording signals on the signal-detection track with the transducer;
recording signals on the write track multiple times with the transducer;
detecting a reduction in the integrity of the recorded signals on the signal-detection track due to recording signals on the write track multiple times, wherein the detected reduction in the integrity of the recorded signals on the signal-detection track represents the amount of the erasure of the recorded signals on the signal-detection track, thereby representing the side track erasure; and
adjusting a recording parameter to reduce the side track erasure in response to the reduction in the integrity of the recorded signals on the signal-detection track exceeding a specified limit.

66. The method of claim 65, wherein the write track and the signal-detection track are adjacent to one another.

67. The method of claim 65, wherein the write track and the signal-detection track are not adjacent to one another.

68. The method of claim 65, wherein:
recording signals on the signal-detection track includes writing a first write pattern on the signal-detection track; and
recording signals on the write track includes writing a second write pattern on the write track, and the first and second write patterns are different.

69. The method of claim 65, wherein:
recording signals on the signal-detection track includes writing a write pattern at a first frequency on the signal-detection track; and
recording signals on the write track includes writing a write pattern at a second frequency on the write track, and the first and second frequencies are different.

70. The method of claim 65, wherein recording signals on the signal-detection track and the write track includes squeezing the signal-detection track and the write track towards one another by another specified limit.

71. The method of claim 65, wherein recording signals on the write track includes using a write current that is larger than a normal operating range of the write current for writing servo patterns and data to the disk with the transducer.

72. The method of claim 65, wherein detecting the reduction in the integrity of the recorded signals on the signal-detection track includes:
determining a characteristic of the recorded signals on the signal-detection track before recording signals on the write track multiple times;
determining a characteristic of the recorded signals on the signal-detection track after recording signals on the write track multiple times; and
comparing the characteristics of the recorded signals on the signal-detection track.

73. The method of claim 72, wherein the characteristics include amplitude.

74. The method of claim 72, wherein the characteristics include error rate.

75. The method of claim 72, wherein the characteristics include bit error rate.

76. The method of claim 72, wherein the characteristics include mean square error.

77. The method of claim 65, wherein the recording parameter is a write current for recording signals on the disk.

78. The method of claim 65, wherein the recording parameter is a recording frequency for recording signals on the disk.

79. The method of claim 65, wherein the recording parameter is a track density for recording tracks on the disk.

80. The method of claim 65, wherein the recording parameter is the number of times of recording signals on the write track.

81. The method of claim 65, wherein the recording parameter is the number of signal-detection tracks on the disk.

82. The method of claim 65, further including:
selecting a second signal-detection track on the disk, wherein the signal-detection track is radially positioned between the write track and the second signal-detection track;
recording signals on the second signal-detection track with the transducer; and
detecting a reduction in the integrity of the recorded signals on the second signal-detection track due to recording signals on the write track multiple times, wherein the detected reduction in the integrity of the recorded signals on the second signal-detection track represents the amount of the erasure of the recorded signals on the second signal-detection track.

83. The method of claim 65, further including:
selecting a second signal-detection track on the disk, wherein the write track is radially positioned between the signal-detection track and the second signal-detection track;
recording signals on the second signal-detection track with the transducer; and
detecting a reduction in the integrity of the recorded signals on the second signal-detection track due to recording signals on the write track multiple times, wherein the detected reduction in the integrity of the recorded signals on the second signal-detection track represents the amount of the erasure of the recorded signals on the second signal-detection track.

84. The method of claim 65, further including providing a warning with a track identification in response to the reduction in the integrity of the recorded signals on the signal-detection track exceeding the specified limit.

85. The method of claim 65, further including providing a data backup in response to the reduction in the integrity of the recorded signals on the signal-detection track exceeding the specified limit.

86. The method of claim 65, wherein the disk includes multiple zones, and the method is performed on a zone-by-zone basis.

87. The method of claim 65, wherein the disk drive includes multiple transducers, and the method is performed on a transducer-by-transducer basis.

88. The method of claim 65, including performing the method in a factory before the disk drive is shipped to an end user.

89. The method of claim 65, including performing the method in the field after the disk drive is shipped to an end user.

* * * * *